United States Patent
Kogusuri (10) Patent No.: US 8,078,039 B2
(45) Date of Patent: Dec. 13, 2011

(54) RECORDING APPARATUS CAPABLE OF RECORDING MOVING IMAGE AND STILL IMAGE

(75) Inventor: Koji Kogusuri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1248 days.

(21) Appl. No.: 10/409,118

(22) Filed: Apr. 9, 2003

(65) Prior Publication Data

US 2003/0202777 A1   Oct. 30, 2003

(30) Foreign Application Priority Data

Apr. 26, 2002 (JP) ................................ 2002-127285

(51) Int. Cl.
*H04N 5/84* (2006.01)
*H04N 5/89* (2006.01)

(52) U.S. Cl. .................... 386/333; 386/239; 386/241

(58) Field of Classification Search .................... 386/69, 386/120, 107, 108, 117, 109, 110, 95–96, 386/125–126, 46, 333; 348/220
See application file for complete search history.

(56) References Cited

U.S. PATENT DOCUMENTS

| | | | | |
|---|---|---|---|---|
| 5,459,582 A * | 10/1995 | Takahashi | ..................... | 386/112 |
| 5,513,010 A * | 4/1996 | Kori et al. | ..................... | 386/104 |
| 5,583,791 A * | 12/1996 | Harigaya et al. | .............. | 348/575 |
| 5,835,667 A * | 11/1998 | Wactlar et al. | .................. | 386/96 |
| 5,875,298 A * | 2/1999 | Harigaya et al. | ........... | 348/416.1 |
| 6,310,848 B1 * | 10/2001 | Ueki | ........................... | 369/53.37 |
| 6,490,407 B2 * | 12/2002 | Niida | .............................. | 386/69 |
| 6,873,785 B2 * | 3/2005 | Moon et al. | ..................... | 386/46 |
| 2001/0005442 A1 * | 6/2001 | Ueda et al. | ..................... | 386/46 |
| 2001/0033333 A1 * | 10/2001 | Suzuki et al. | ................. | 348/220 |

FOREIGN PATENT DOCUMENTS

JP    2001-054053    2/2001

* cited by examiner

*Primary Examiner* — Jamie Atala

(74) *Attorney, Agent, or Firm* — Fitzpatrick, Cella, Harper & Scinto

(57) ABSTRACT

A recording apparatus for extracting a still image from a moving image signal that is currently being recorded, at a predetermined timing, wherein when an additional still image is newly extracted after extracting N pictures of still images, one of the N pictures of still images already extracted is deleted, and still image signals of N pictures to which the newly extracted one picture of still image is added in place of the deleted one picture of still image are generated.

6 Claims, 8 Drawing Sheets

RECORDING APPARATUS CAPABLE OF RECORDING MOVING IMAGE AND STILL IMAGE

BACKGROUND OF THE INVENTION

1. Field of the Invention

The present invention relates to a recording apparatus, and more particularly to an apparatus for recording a moving image and also a still image.

2. Related Background Art

Up until now, a video camera is known as a device for photographing moving image data and for recording and reproducing it to and from an optical disk, a magnetic disk, a memory card, or other such recording media.

Further, the video camera is connected to a personal computer (PC), and one picture included in the moving image data reproduced by the video camera is extracted on the PC to save this as a still image file, and the video camera can also record a high-definition still image onto the recording medium, in addition to the moving image.

However, since the moving image data is generally recorded in an interlace manner, in a case where one picture is extracted from the moving image as the still image and is recorded, the image is blurred due to movement by an object. Further, when recording the moving image data, image pixels are decreased in order to reduce an information volume. Therefore, the image pixels are fewer in number as compared to the still image data, and thus it is extremely difficult to extract a high-definition still image from the moving image.

In order to overcome the above-mentioned problem, photographing the moving image and photographing the still image can be performed simultaneously. However, when this is performed, in many cases, obstructions are caused to the moving image. For example, the moving image is blurred when the still image shutter for recording the still image is operated while photographing the moving image.

SUMMARY OF THE INVENTION

The present invention has an object thereof to solve the problems described above.

Another object of the present invention is to enable recording of a satisfactory still image, without causing obstructions to photographing of the moving image.

Another object of the present invention is to enable recording of the moving image and the high-definition still image, without the user's intention.

In order to achieve such objects, the present invention provides, according to one aspect thereof, a recording apparatus including:

input means for inputting a moving image signal;

recording means for recording the moving image signal onto a recording medium;

still image processing means for extracting, at predetermined timing, a still image from the moving image signal currently being recorded by the recording means and generating a still image signal; and control means for controlling the still image processing means so that when the still image processing means newly extracts an additional still image after extracting N pictures of still images (where N is a predetermined integer of 2 or greater) from the moving image signal, one of the N pictures of still images already extracted is deleted and still image signals of N pictures to which the newly extracted one picture of still image is added in place of the deleted one picture of still image are generated.

DESCRIPTION OF THE PREFERRED EMBODIMENTS

Hereinafter, description will be made of embodiments of the present invention with reference to the drawings.

Figure 1:
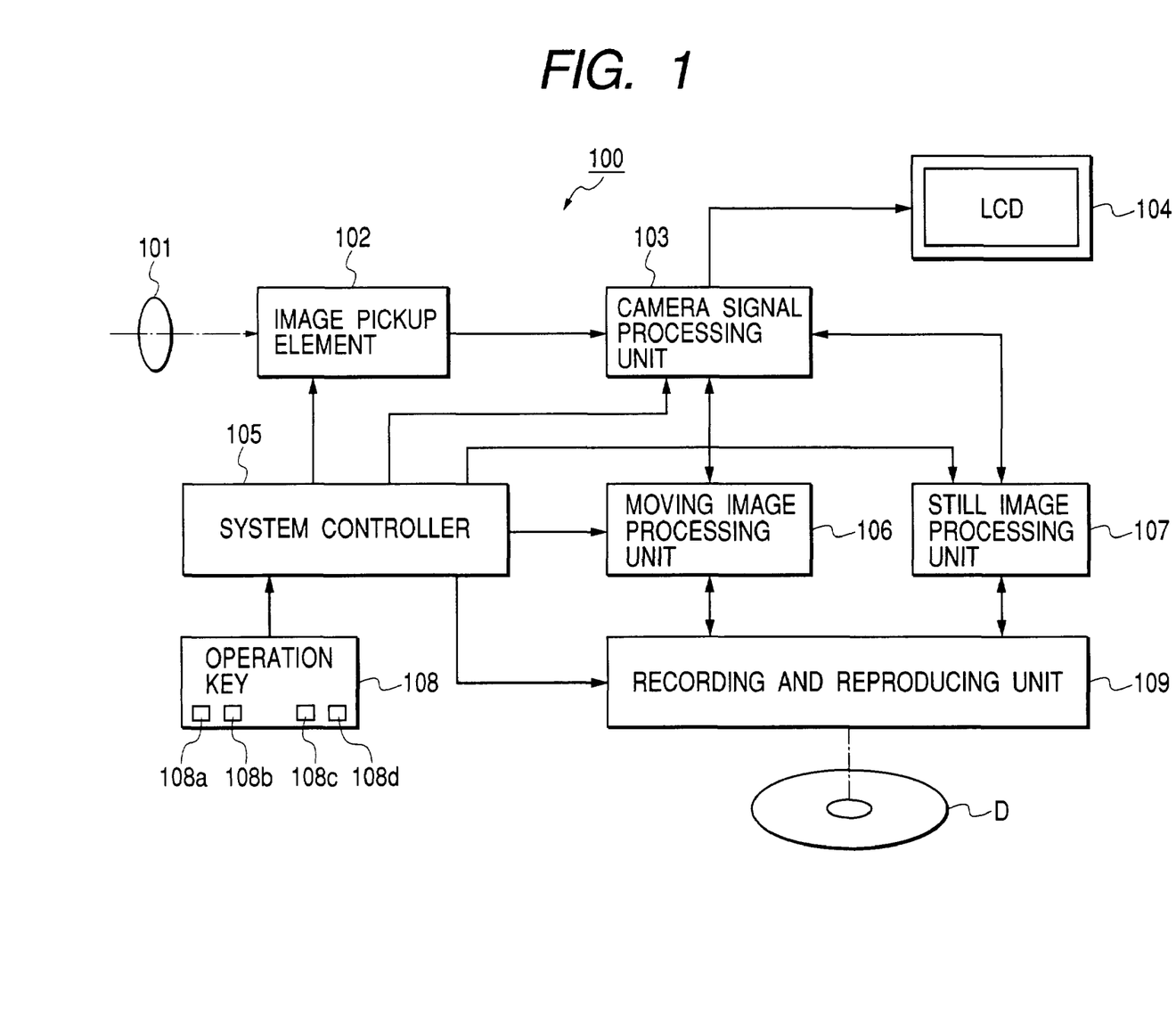
FIG. 1 is a block diagram showing a construction of an image recording and reproducing apparatus to which the present invention is applied.

The present invention is applied, for example, to an image recording and reproducing apparatus 100 such as shown in FIG. 1. The image recording and reproducing apparatus 100 of this embodiment is an apparatus which can record a moving image and a still image, which are obtained by means of a photographing operation, onto a disk-type recording medium D, and also can simultaneously perform photographing of the moving image and the still image. More particularly, the apparatus has a construction characterized as follows:

While photographing the moving image, the high-definition still image is automatically recorded without the user's intention.

An automatic still image recording interval T, which is an interval at which the high-definition still images are automatically recorded, is automatically changed while photographing the moving image.

When an order of priority is applied to the automatically recorded still images, and the still image is recorded onto a recording medium 110, if a residual capacity of the recording medium 110 is insufficient, a still image with a low order of priority is deleted or overwritten.

According to the above-mentioned construction, several high-definition still image data which are automatically recorded while photographing one moving image clip, are compiled in one still image folder, and after photographing, they are reproduced in the chronological sequence in which they were recorded, whereby they can be used as a slide show reproduction of the moving image clip. When the slide show reproduction is performed, the slide show reproduction intervals may be determined based on the intervals between the recording times of the still images contained in the still image folder, or the length of photographing time of the moving image clip.

Hereinafter, detailed description will be given regarding a construction and operations of the image recording and reproducing apparatus 100 of this embodiment.

Construction of the Image Recording and Reproducing Apparatus 100

As shown in FIG. 1, the image recording and reproducing apparatus 100 is provided with: a lens 101 for guiding object light to an image pickup element 102 provided at a post-stage thereof; the image pickup element 102 for imaging the object light from the lens 101; a camera signal processing unit 103 for executing signal processing to convert a photoelectric conversion image signal from the image pickup element 102 into a standard image signal; an LCD 104 for displaying an image according to the image signal obtained from the camera signal processing unit 103, and moving image data and still image data outputted from a moving image processing unit 106 and a still image processing unit 107; a system controller 105 for performing overall operation controls of the image recording and reproducing apparatus 100; the moving image processing unit 106 for compressing/encoding the image signal (the moving image signal) obtained from the camera signal processing unit 103; the still image processing unit 107 for compressing/encoding the image signal (the still image signal) obtained from the camera signal processing unit 103; operation keys 108 including a moving image recording switch 108a, a still image recording switch 108b, a determination key 108c, and a reproduction key 108d; and a recording and reproducing unit 109 for recording the encoded image signals obtained from the moving image processing unit 106 and the still image processing unit 107, as an image file on the disk D, and also reproducing images from the recording medium 110.

Figure 2:
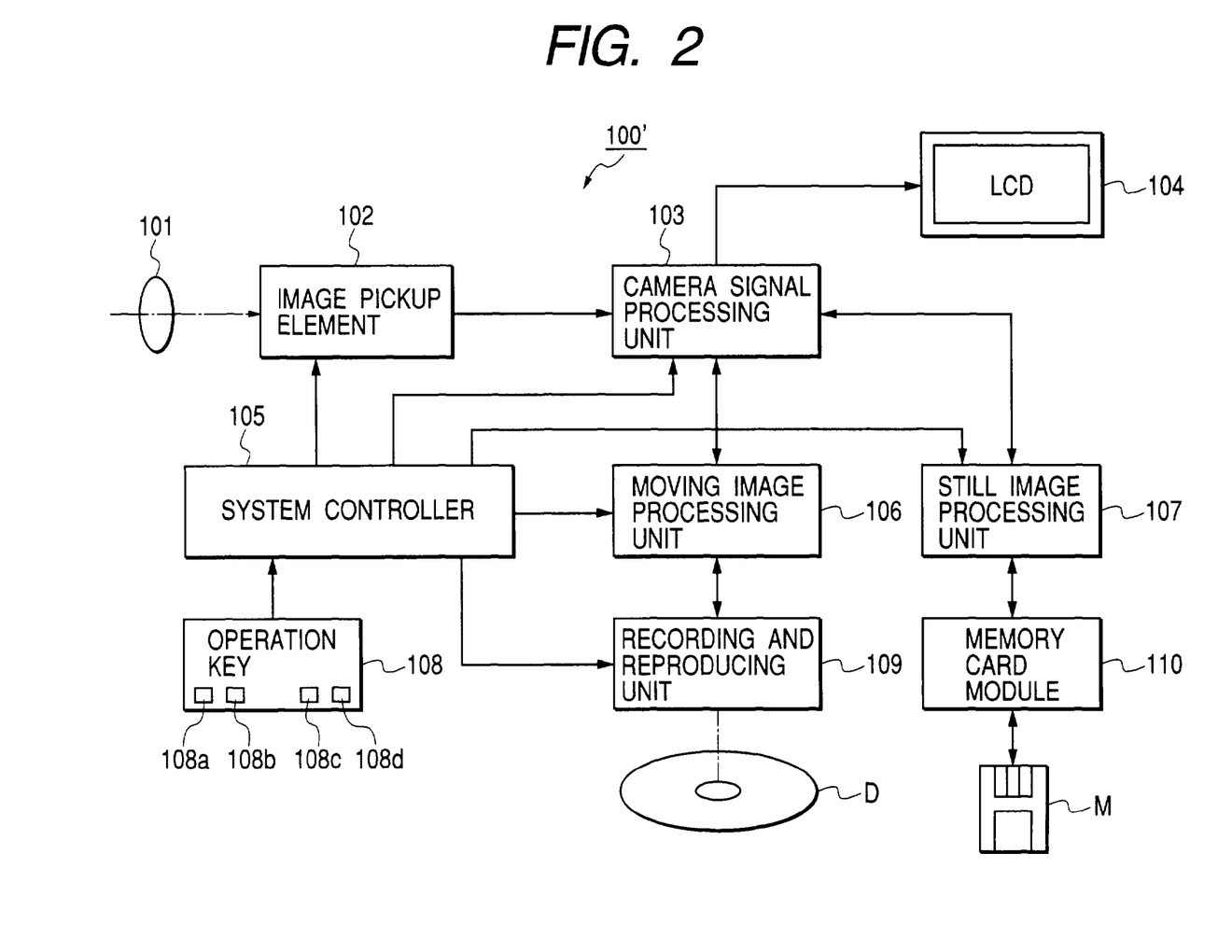
FIG. 2 is a block diagram showing another construction example of the image recording and reproducing apparatus.

Note that, the construction of the image recording and reproducing apparatus 100 shown in FIG. 1 may also be changed to a construction, for example, as shown in FIG. 2.

Namely, an image recording and reproducing apparatus 100' shown in FIG. 2 records the moving image (the moving image file) onto the disk D, and records the still image (the still image clip) onto a memory card M. For that reason, the image recording and reproducing apparatus 100' is provided with a memory card module 110 for recording the still image file onto the memory card M.

Figure 3A:
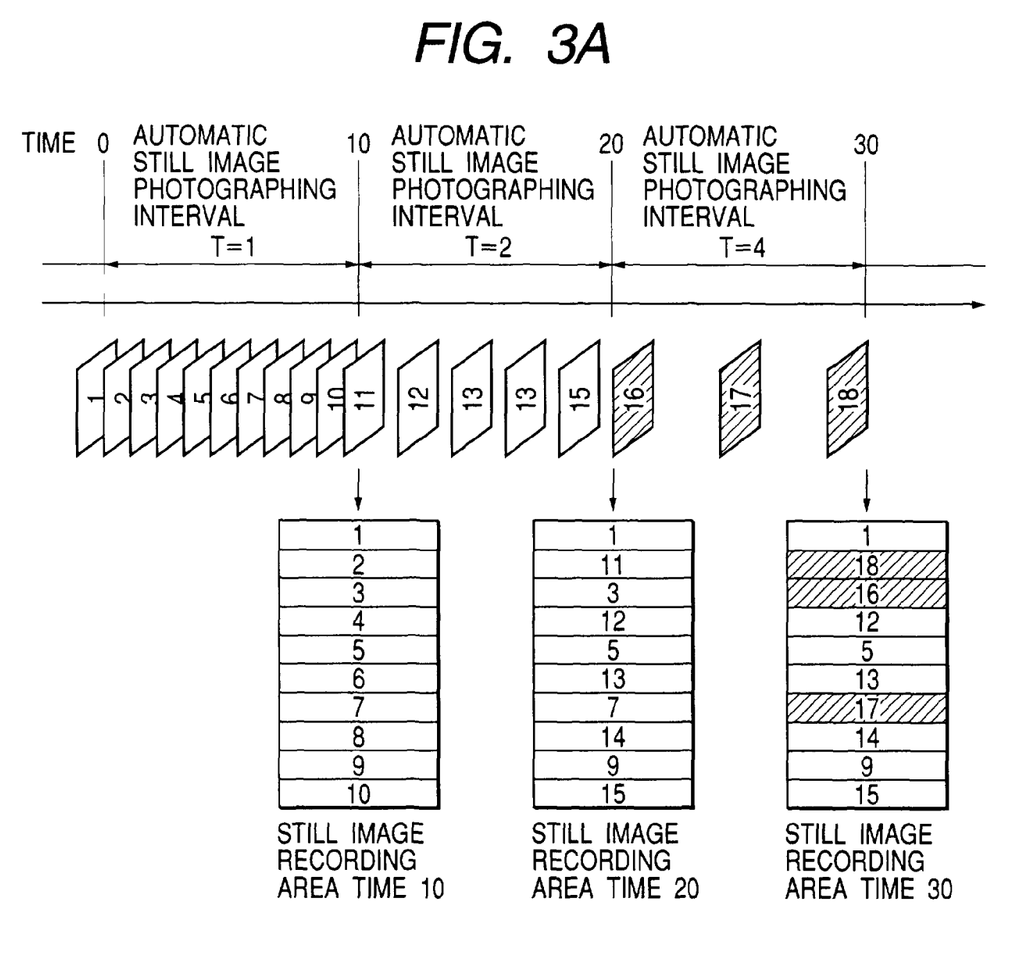
FIGS. 3A, 3B and 3C are views for explaining automatic still image recording operations of the image recording and reproducing apparatus.
Figure 3B:
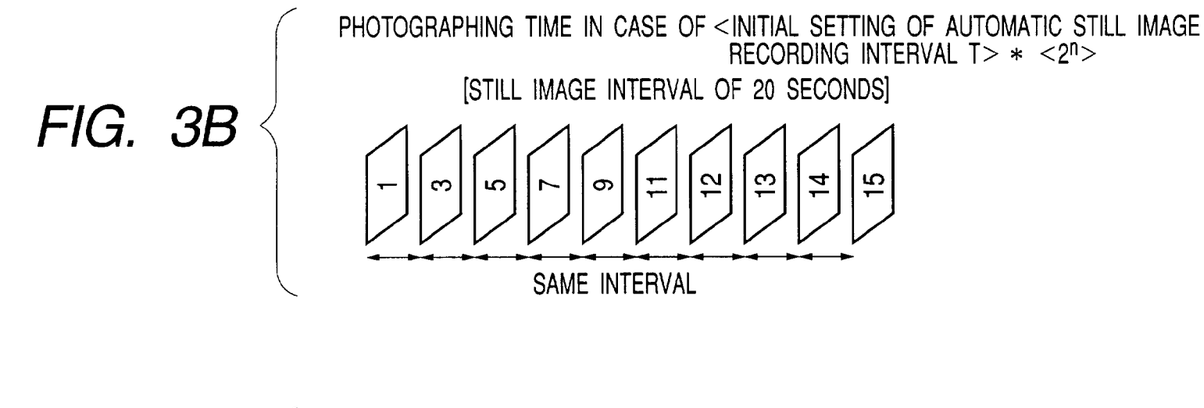
Figure 3C:
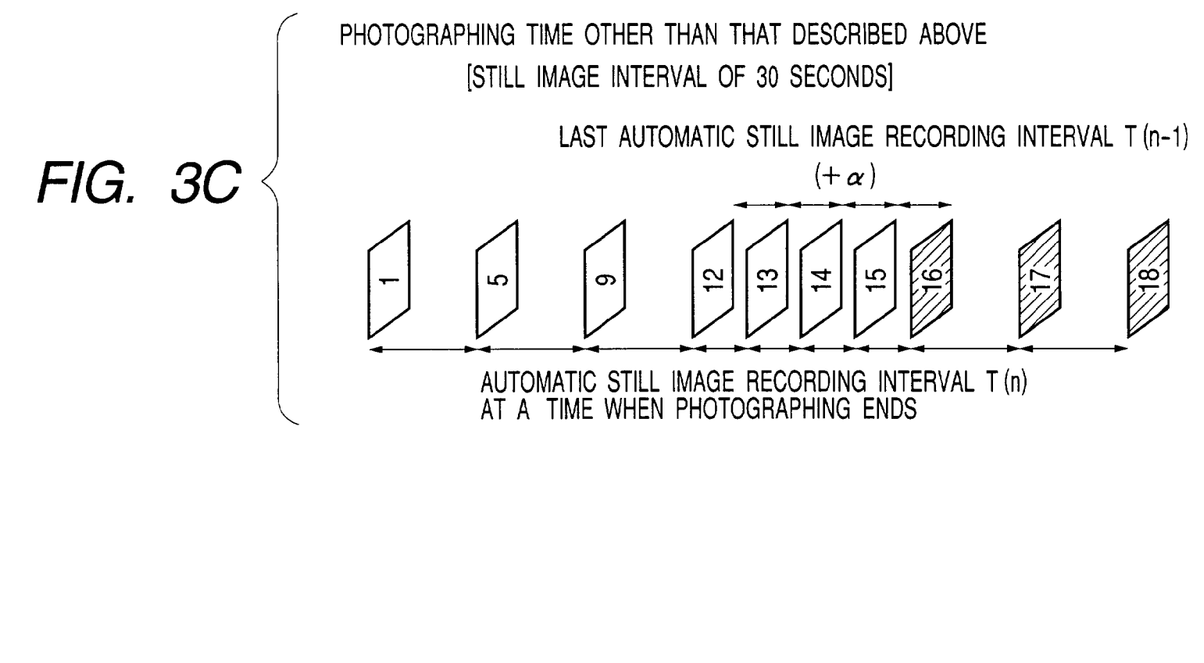

FIGS. 3A, 3B and 3C show the most characteristic construction of the image recording and reproducing apparatus 100, that is, a feature of moving image recording operation and automatic still image recording operation of the present invention.

First, it is assumed that the image recording and reproducing apparatus 100 is set by the operation keys 108 to a mode for recording the still image automatically while photographing the moving image (i.e., an automatic still image recording/moving image photographing mode).

Further, the interval at which the image recording and reproducing apparatus 100 automatically records the still images without the user's intention while photographing the moving image, is set to an "automatic still image recording interval T", where an initial setting value is set at "1 second" (i.e., T=1). It is noted that a number of still images recorded in one moving image clip is denoted by "N", wherein the number of still images is set to "10 images" (N=10) for example, and an "automatic still image recording counter C" denotes a counter for determining whether or not to record the still image, wherein an initial setting value thereof is set to "0" (C=C).

Then, the user photographs the moving image by means of the image recording and reproducing apparatus 100, in the automatic still image recording/moving image photographing mode.

When an instruction to start photographing is given by operating the moving image recording switch 108a, the image recording and reproducing apparatus 100 performs counting with the automatic still image recording counter once per second, and when the counter value C exceeds the automatic still image recording interval T, namely when the counter value C becomes equal to or greater than 1 second (C=1 second), the still image is automatically recorded without the user's intention, and the counter value C is reset to 0.

When the image recording and reproducing apparatus 100 executes the above-mentioned operation by the set number of recorded still images N, namely, 10 images (i.e., 10 times), this results in a situation (see "still image recording area time 10" in FIG. 3A) in which there remains no space in a still image recording area assigned for the moving image clip currently being photographed. Therefore, when another still image is photographed subsequently, the still image with the lowest order of priority among those photographed up to that point in the moving image clip that is being currently photographed is deleted, and the newly photographed still image is recorded.

For example, as shown in FIG. 3B, in a case where an element for judging the order of priority is set to "same interval", the image recording and reproducing apparatus 100 photographs ten still images during 10 seconds from starting photographing the moving image. After that, in a case where another still image file 11 is newly photographed, a still image file 2 is deleted and the still image file 11 is recorded.

At this time, since the moving image photographing time of 10 (T*N) seconds has elapsed, the image recording and reproducing apparatus 100 sets the value of the automatic still image recording interval T to "2 seconds", which is double the currently set value of "1 second".

After that, the image recording and reproducing apparatus 100 forms the still image file at 2-second intervals according to the automatic still image recording interval T which has been re-set, and each time a new still image file is formed, the still image file with the lowest order of priority among the 10 still image files recorded up to that point is deleted to record the newly prepared still image file.

In other words, the image recording and reproducing apparatus 100 operates in the automatic still image recording/moving image photographing mode, so that:

a still image file 4 is deleted, and a still image file 12 is recorded; and a still image file 6 is erased, and a still image file 13 is recorded.

As a result of the above-mentioned operation, when the moving image photographing time reaches 20 seconds, the still image data recorded onto the still image recording area of the disk D shows a state of "still image recording area time 20", shown in FIG. 3A. Further, when the moving image photographing time reaches 30 seconds, the still image data recorded in the still image recording area of the disk D shows a state of "still image recording area time 30", shown in FIG. 3A.

Therefore, when moving image photographing time has elapsed for the initial setting of automatic still image recording interval T×2" (see FIG. 3B), the still images are recorded at same intervals.

Further, still images recorded based on the elapsed time other than that described above (see FIG. 3C) are provided still images at same intervals+(still image at automatic still image recording interval T (n) at a time when photographing ends+<still image at last automatic still image recording interval T (n−1)).

As a result, a portion occurs where the recording intervals of the still images are dense. In FIG. 3C, still image files 13 and 15 are still image files corresponding to a.

By thus recording the still image while photographing the moving image, the still image relating to the moving image clip can be recorded without the user's intention.

Here, the number of recorded still images N with respect to one moving image is set as "10 images" for example. Therefore, 10 still images are recorded as one still image file group.

Note that, in accordance with this embodiment, the order of priority for deleting the still image file is determined based on "same interval" as an example, but the present invention is not limited to this. For example, using a result from a motion detection, pictures with much motion may be given high priority, or pictures near the beginning of photographing the moving image clip may be given high priority, and the still image file may be deleted based on the order of priority thus determined.

Operations of the Image Recording and Reproducing Apparatus 100

Figure 4:
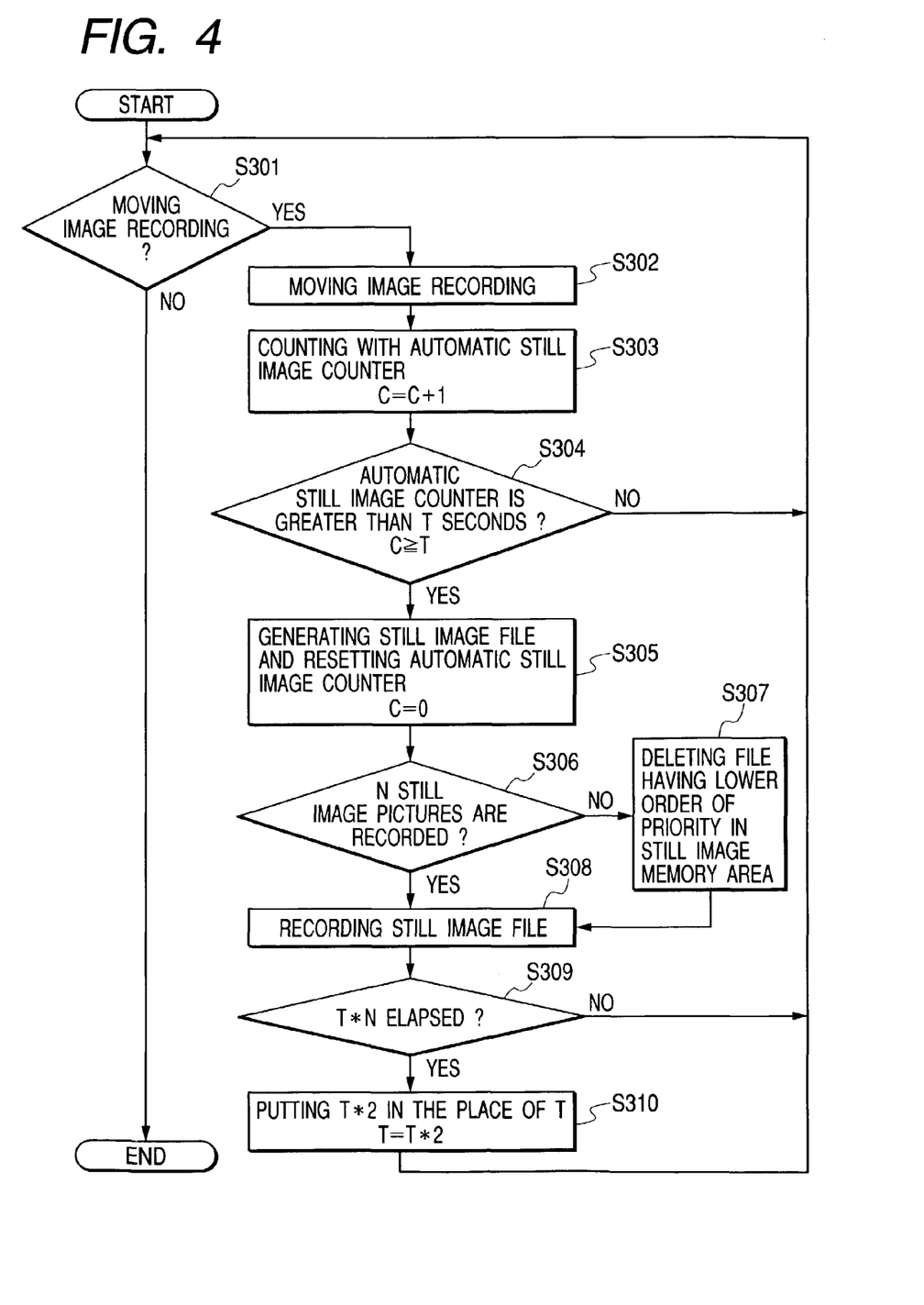
FIG. 4 is a flowchart for explaining operations of the image recording and reproducing apparatus.

FIG. 4 is a flowchart showing a control operation by a system controller 105 of the image recording and reproducing apparatus 100.

Step S301: whether to record the moving image is selected by the user operating the operation keys 108 of the image recording and reproducing apparatus 100.

In the image recording and reproducing apparatus 100, the system controller 105 recognizes the key operation by the user, and in a case where the moving image recording switch 108a is operated and the instruction to start the moving image recording is given, processing is then started from next step S302. In a case where an instruction to stop recording the moving image is given by the moving image recording switch 108a, or when it is otherwise selected not to record the moving image, this processing ends.

Step S302:

When the user selectes to record the moving image, the system controller 105 causes the image recording and reproducing apparatus 100 to perform the moving image recording operation.

Accordingly, the moving image processing unit 106 processes the image signal obtained from the camera signal processing unit 103, and the recording and reproducing unit 109 records the processed image signal onto the recording medium 110.

Step S303 and Step 304:

The system controller 105 performs counting up on the counter value C of the automatic still image recording counter once a second (C=C+1) (step S303), and it is judged whether or not the resulting counter value C exceeds the automatic still image recording interval T (step 304).

In a case where the result of the judgement made at step S304 indicates that C is equal to or greater than T, the processing advances to step S305. Otherwise, the processing returns again to step S301.

Step S305:

The still image processing unit 107 processes the image signal (the still image signal) obtained from the camera signal processing unit 103, under control of the system controller 105, and the still image file is generated. Further, the system controller 105 resets the counter value C (C=0).

Step S306:

Via the recording and reproducing unit 109, the system controller 105 judges whether or not N (designated number of pictures) still image files are recorded on the memory area (still image memory area) for recording the still image files on the disk D.

As a result of the judgement, in a case where each N still image files have already been recorded, the processing advances to step S308 via step S307, otherwise, the processing advances directly to step S308.

Step S307:

The system controller 105 deletes the file with the low order of priority existing in the still image memory area of the recording medium 110.

Step S308:

The recording and reproducing unit 109 records the still image file generated at step S305 onto the still image memory area of the disk D, under control of the system controller 105. At this time, a folder for recording the still mage file is linked to the moving image clip and is generated on the disk D, and the still image file is recorded into this folder.

Further, when this is performed, the still image processing unit 107 additionally records into the still image file, information of the still image recording interval T that is set when the still image file is recorded as well.

Step S309:

The system controller 105 judges whether or not the moving image photographing time T*N has elapsed. When the result of the judgement indicates that the moving image photographing time T*N has elapsed, the processing returns again to step S301 via step S310. Otherwise, the processing returns directly to step S301.

Step S310:

The system controller 105 sets the automatic still image recording interval T to a value that is double the value that is currently set as the automatic still image recording interval T (T=2*T).

Note that, in accordance with this embodiment, the disk D is used as the recording medium for recording the moving image and the still image. However, as shown in FIG. 2, the moving image file may be recorded onto the disk D, and the still image file may be recorded onto the memory card M.

In this way, according to this embodiment, while photographing one moving image clip, still images of N pictures are automatically recorded simultaneously, thereby causing no obstruction to the photographing of the moving image, and enabling recording of a satisfactory still image.

Next, description will be given regarding processing at a time of reproducing the moving image file and the still image file which have been recorded as described above.

Figure 5A:
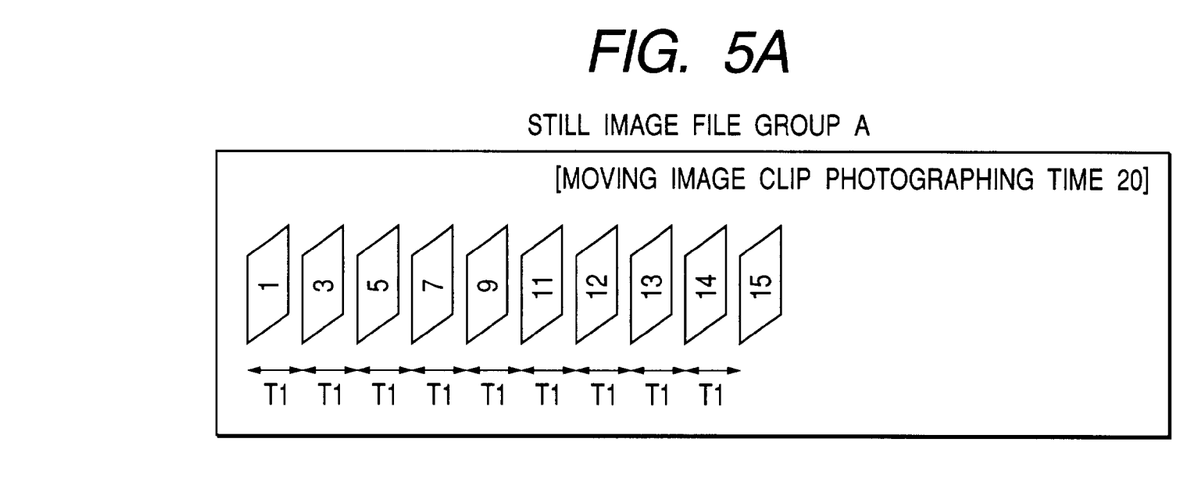
FIGS. 5A and 5B show conditions in still image file groups recorded at a moving image photographing time.
Figure 5B:
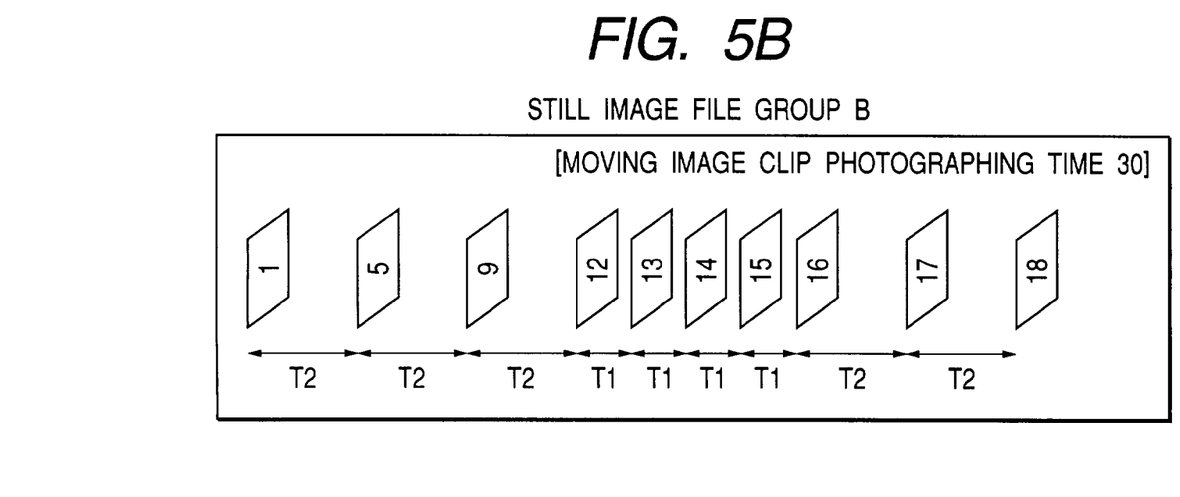

For example, as shown in FIGS. 5A and 5B, a still image file group recorded by the image recording and reproducing apparatus 100 during photographing of the moving image clip for 20 seconds, is referred to as a still image file group A, and a still image file group which is during photographing the moving image clip for 30 seconds, is referred to as a still image file group B.

In a case of reproducing the still image file group A shown in FIG. 5A, when a still image reproduction mode is set using the operation keys 108, the system controller 105 controls the recording and reproducing unit 109 to sequentially reproduce the first picture of each still image file group corresponding to the plurality of moving image clips recorded on the disk D, and outputs these via the still image processing unit 107 to the camera signal processing unit 103. The camera signal processing unit 103 performs an index display of the reproduced first pictures from each of the still image file groups, as indicated by reference numeral 601 in FIG. 6. The user operates a direction key (not shown in the figure) among the operation keys 108, to select a desired still image file group from among the still image files being index displayed in this way.

Figure 6:
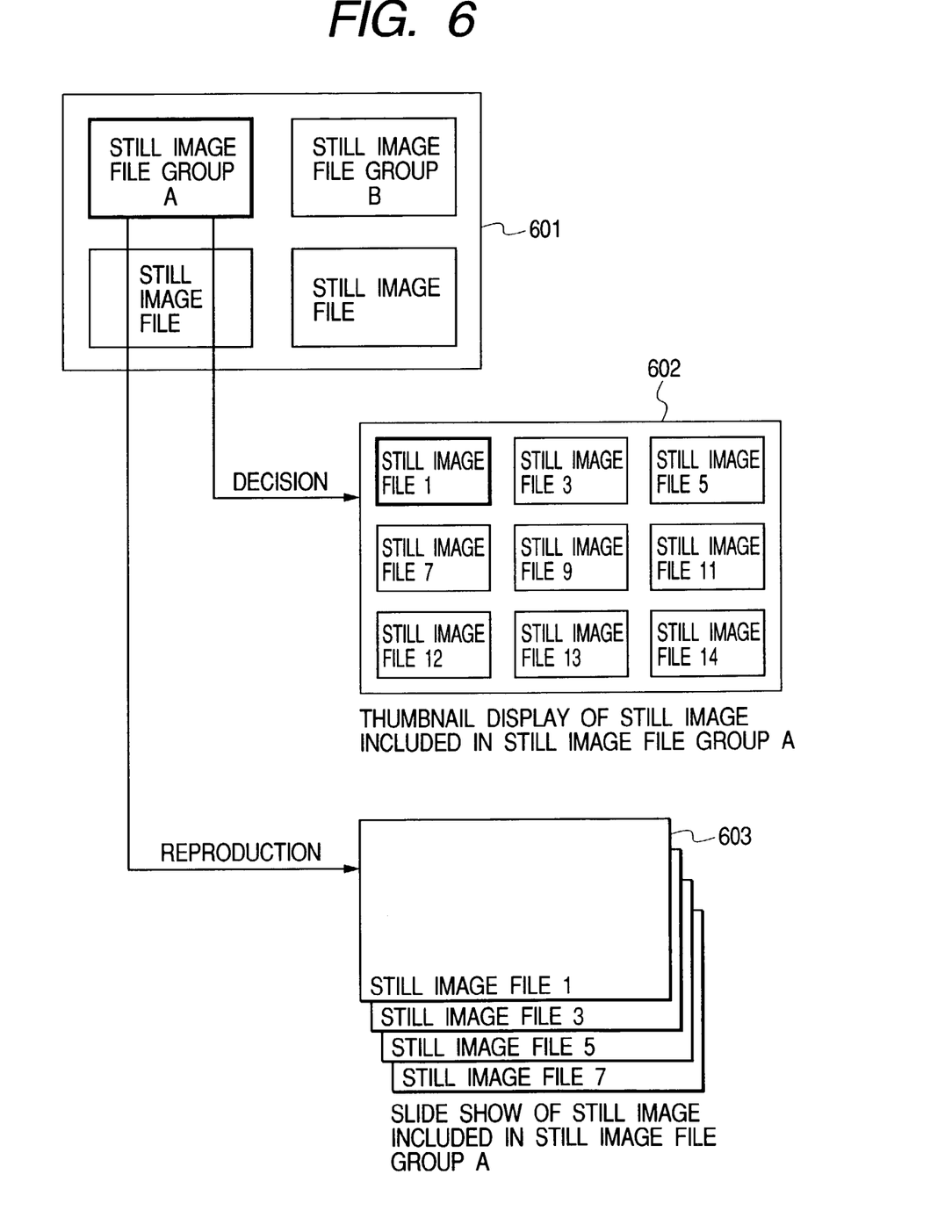
FIG. 6 shows the condition upon reproduction of the sill image file group.

Here, in a case where the user wants to view a list of the still images included in the still image file group A, the user selects the still image file group A on the index picture 601, and operates the determination key 108*c*.

When the user operates the determination key 108*c*, the system controller 105 controls the recording and reproducing unit 109 to sequentially reproduce from the disk D each still image file in the still image file group A, and outputs the still image files to the still image processing unit 107. The still image processing unit 107 decodes these still image files and outputs them to the camera signal processing unit 103, and the camera signal processing unit 103 displays the still images included in the still image file group A as a list on an LCD 104, as indicated by reference numeral 602.

The user selects the desired still image file from among the still images of the still image file group A thus displayed as a list, and operates the determination key 108*c*. When the user operates the determination key 108*c*, the system controller 105 controls the recording and reproducing unit 109 to reproduce the designated still image file from the disk D, and after being decoded by the still image processing unit 107, the designated still image is displayed by the camera signal processing unit 103 on the LCD 104 in place of the list display indicated by reference numeral 602.

On the other hand, the still image file group selected by the operation of the reproduction key 108*d* can be reproduced as a moving image clip slide show on the display picture 601.

Namely, after the user selects the still image file group A on the display picture 601, when the reproduction key 108*d* is operated, the system controller 105 controls the recording and reproducing unit 109 to sequentially reproduce from the disk D each still image file in the still image file group A according to the recording times, and the camera signal processing unit 103 outputs the still image files to the LCD 104 via the still image processing unit 107, whereby they are reproduced as the slide show. This slide show reproduction is shown by reference numeral 603 in FIG. 6. When the slide show reproduction is started, the slide show pictures are displayed on the LCD 104 in place of the list picture.

Here, according to this embodiment, when performing the slide show reproduction, the slide show display intervals are changed according to the intervals at which the still images of the still image file are recorded.

For example, in the case of the still image file group A shown in FIG. 5A, the corresponding moving image clip is recorded for 20 seconds, and the recording intervals of the still images are all T1. On the other hand, in the case of the still image file group B shown in FIG. 5B, the corresponding moving image clip is recorded for 30 seconds, and the recording intervals of the still images are defined as T1 and T2.

In accordance with this embodiment, when performing the slide show reproduction, in a case where the photographing interval between two consecutive still images is T1, the still image display period is 0.5 second, and in a case where the interval is T2, a display period is double the above period, that is, 1 second.

Therefore, when performing the slide show reproduction of the still image file group A, each still image is displayed for 0.5 second, and a still image file containing 10 images is reproduced as the slide show at 0.5-second intervals, thus ending 5 seconds after starting the slide show reproduction.

On the other hand, when performing the slide show reproduction of the still image file group B, the first 3 pictures are each reproduced for 1 second, and the subsequent 4 pictures are each reproduced for 0.5 second, and the last 3 pictures are each reproduced for 1 second.

Note that, in a case where the still image photographing interval is increased to T3 and T4, the display periods when performing the slide show reproduction are correspondingly lengthened to 2 seconds and 4 seconds.

Further, in accordance with this embodiment, the reproduction period for each still image at the slide show reproduction is set in relation to the automatic still image recording intervals T1 and T2. However, the present invention is not limited to this embodiment. For example, the reproduction period may also be changed to a time period that is arbitrarily determined by an instruction from the user. Alternatively, the still image file with the highest order of priority may also be reproduced with a long reproduction interval.

Note that, to achieve the object of the present invention, a storage medium storing a software program code for realizing the host and terminal functions of Embodiments 1 and 2 may be provided to a system or to an apparatus, and a computer (or a CPU or MPU) in the system or the apparatus may read and execute the program code stored in the storage medium.

In such a case, the program code itself which is read out from the storage medium realizes the function of the embodiment, and the present invention is constituted by the storage medium storing the program code, and by the program code.

For the storage medium which supplies the program code, a ROM, a flexible disk, a hard disk, an optical disk, a magneto-optical disk, a CD-ROM, a CD-R, a magnetic tape, a non-volatile memory card and the like can be used.

Further, the present invention includes not only the case in which the program code that is read out by the computer is executed but also a case in which an OS and the like operating on the computer perform a portion of or all of the actual processing based on the instructions from the program code to realize the functions of this embodiment.

Further, the present invention also includes a case in which the program code that is read out from the storage medium is written to a memory provided to a function extension board inserted into the computer or a function expansion unit connected to the computer, and after that, a CPU or the like which is provided to the function expansion board or the function expansion unit performs a portion of or all of the actual processing and the functions of the embodiment are realized by this processing.

Figure 7:
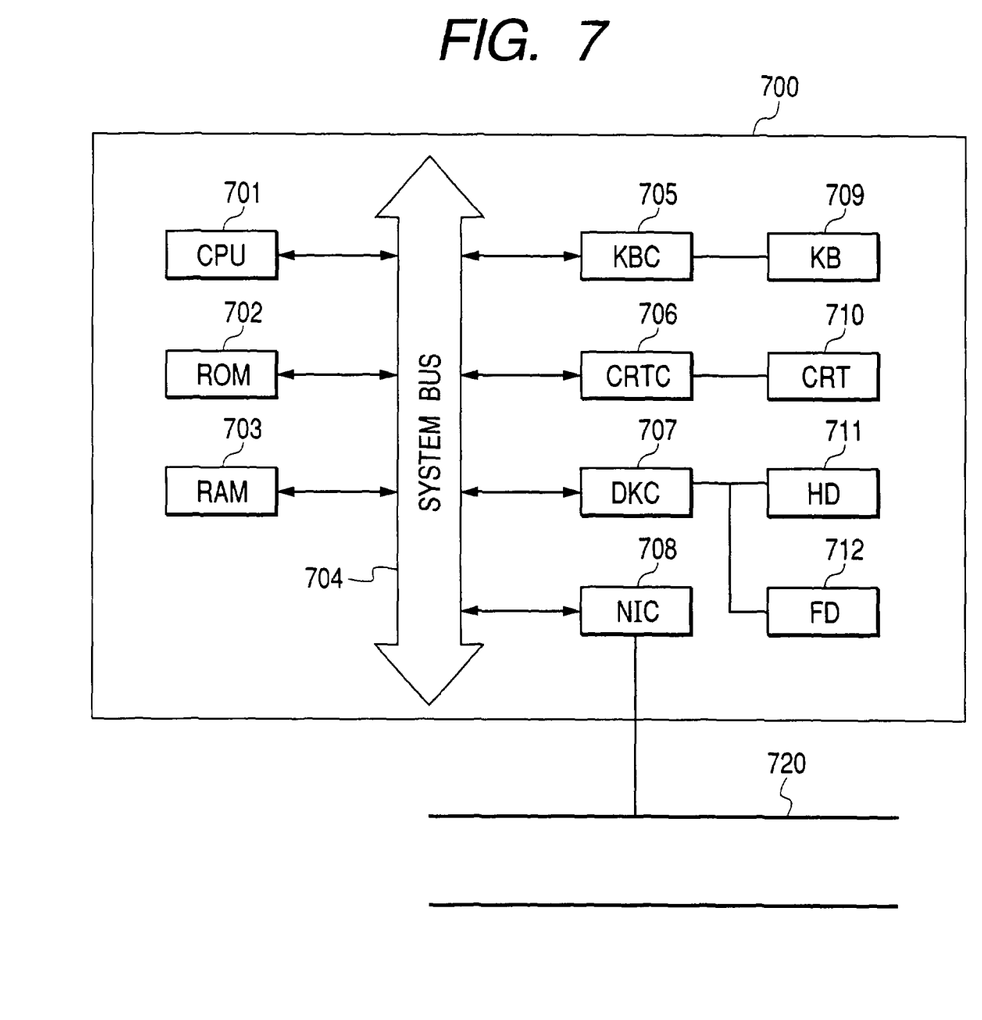
FIG. 7 is a block diagram showing a construction of a computer for reading out from a computer-readable storage medium and executing a program for realizing the functions of embodiments of the present invention on a computer.

FIG. 7 shows such a computer function 700. As shown in FIG. 7, the computer function 700 is configured with a CPU 701, a ROM 702, a RAM 703, a keyboard controller (KBC) 705 for a keyboard (KB) 709, a CRT controller (CRTC) 706 for a CRT display (CRT) 710 serving as a display unit, a hard disk controller (DKC) 707 for a hard disk (HD) 711 and for a flexible disk (FD) 712, and a network interface controller (NIC) 708 for connection to a network 720, all of which are communicably connected to each other through a system bus 704.

The CPU 701 executes software recorded on the ROM 702 or on the HD 711, or software supplied from the FD 712, and integrally controls each component connected to the system bus 704.

In other words, the CPU 701 reads from the ROM 702 or the HD 711 or the FD 712, the processing program according to a predetermined processing sequence to execute the program, thereby performing a control for realizing the operations of this embodiment.

The RAM 703 functions as a main memory or as a work area or the like for the CPU 701. The KBC 705 controls instruction input from the KB 709 or a pointing device or the like, which is not shown in the diagram. The CRTC 706 controls the display by the CRT 710. The DKC 707 controls access to the HD 711 and the FD 712, which store a boot program, a variety of applications, an editing file, a user file, a network management program, certain processing programs used in this embodiment, and the like. The NIC 708 performs bi-directional exchanges of data with the apparatus or the system over the network 720.

As explained above, in accordance with this embodiment, the high-definition still image can be automatically recorded while photographing the moving image, without the user's intention, and without obstructing the photographing of the moving image. Further, the still images can be automatically recorded at the timing corresponding to the same interval in the moving image clip set by the user, or at the timing corresponding to the beginning portion of the clip or to important portions of the moving image.

Further, the still images that were simultaneously recorded while photographing the moving image are compiled into a folder on the disk per moving image clip, and by reproducing this folder, the slide show reproduction per moving image clip becomes possible. Moreover, when this is performed, the reproduction intervals used in the slide show reproduction are changed according to the recording times of the still images in the folder, or the like, whereby a more effective slide show can be performed.

Many different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
    an input unit configured to input a moving image signal;
    a moving image recording unit configured to record on a recording medium the moving image signal input by the input unit, the moving image recording unit starting to record the moving image signal on the recording medium in accordance with a moving image recording start instruction for instructing to start recording the moving image signal, and stopping recording the moving image signal in accordance with a moving image recording stop instruction for instructing to stop recording the moving image signal;
    a still image recording unit configured to generate a still image signal corresponding to a picture designated from a plurality of pictures included in the moving image signal input by the input unit, and to record the generated still image signal on the recording medium on which the moving image signal is recorded; and
    a controller that controls the still image recording unit to operate in response to the moving image recording start instruction,
    wherein the controller controls the still image recording unit to operate during a time period from the moving image recording start instruction to the moving image recording stop instruction so as to automatically generate a plurality of still image signals of different pictures and to record the plurality of still image signals on the recording medium on which the moving image signal is recorded, while the moving image recording unit records the moving image signal, and
    wherein the controller controls the still image recording unit to automatically record the still image signals of N pictures (where N is a predetermined integer of 2 or greater), among still image signals of more than N pictures generated during the time period from the moving image recording start instruction to the moving image recording stop instruction, on the recording medium on which the moving image signal is recorded, even if the still image recording unit generates the still image signals of more than N pictures during the time period from the moving image recording start instruction to the moving image recording stop instruction.

2. An apparatus according to claim 1, wherein the still image recording unit generates the still image signal at a predetermined time interval in accordance with the moving image recording start instruction.

3. An apparatus according to claim 2, wherein the still image recording unit changes the predetermined time interval on the basis of a time elapsed from a start of recording the input moving image signal in a moving image recording mode.

4. An apparatus according to claim 1, wherein the input unit includes a photographing unit configured to photograph an object image to output the moving image signal.

5. A recording apparatus comprising:
    a moving image recording unit configured to record one moving image clip on a recording medium in accordance with a moving image recording start instruction for instructing to start recording a moving image;
    a still image recording unit configured to generate a plurality of still image signals corresponding to a plurality of pictures designated from the one moving image clip at a time interval and to record the generated still image signals on the recording medium on which the one moving image clip is recorded; and
    a controller configured to control the still image recording unit to operate in response to the moving image recording start instruction,
    wherein the controller controls the still image recording unit so as to generate still image signals of N pictures (where N is a predetermined integer of 2 or greater) designated from the one moving image clip and to record the generated still image signals of N pictures on the recording medium on which the one moving image clip is recorded during recording of the moving image clip by the moving image recording unit,
    wherein the controller determines the time interval at which the pictures for the still image signals are generated from the one moving image clip, in accordance with a length of the one moving image clip, and
    wherein the still image recording unit automatically designates the N pictures from the one moving image clip at the time interval determined by the controller and generates the still image signals of N pictures.

6. An apparatus according to claim 5, wherein the controller determines the time interval such that the longer the length of the one moving image clip is, the longer the time interval to be determined by the controller is.

\* \* \* \* \*